United States Patent
Birks

[11] 3,760,634
[45] Sept. 25, 1973

[54] ULTRASONIC NONDESTRUCTIVE MATERIAL TESTER

[75] Inventor: Albert S. Birks, Longmont, Colo.

[73] Assignee: Automation Industries, Inc., Century City, Calif.

[22] Filed: Aug. 3, 1971

[21] Appl. No.: 168,778

Related U.S. Application Data

[63] Continuation of Ser. No. 790,308, Jan. 10, 1969, abandoned.

[52] U.S. Cl. .............................................. 73/67.8 R
[51] Int. Cl. ........................................... G01n 29/04
[58] Field of Search ..................... 73/67.5–67.9, 71.5

[56] References Cited
UNITED STATES PATENTS

| 2,532,507 | 12/1950 | Meunier | 73/71.5 X |
| 2,984,756 | 5/1961 | Bradfield | 73/67.9 UX |
| 3,122,661 | 2/1964 | Joy | 73/71.5 X |
| 3,220,248 | 11/1965 | Wood | 73/67.7 |
| 3,233,450 | 2/1966 | Fry | 73/67.8 |
| 3,417,609 | 12/1968 | Graham | 73/71.5 |

Primary Examiner—Richard C. Queisser
Assistant Examiner—John P. Beauchamp
Attorney—Dan R. Sadler

[57] ABSTRACT

A nondestructive test system is described which includes a search unit with a first crystal transducer which radiates ultrasonic energy into a workpiece for testing purposes. A second crystal transducer is included which provides a low frequency ultrasonic energy to agitate liquid couplants used with the search unit in order to eliminate or diminish the formation of a vapor phase at the inner face of the liquid couplant and the workpiece when testing a hot workpiece.

10 Claims, 5 Drawing Figures

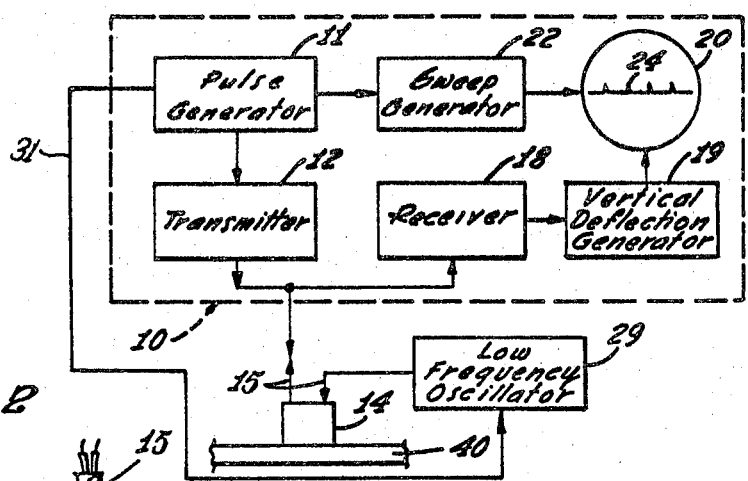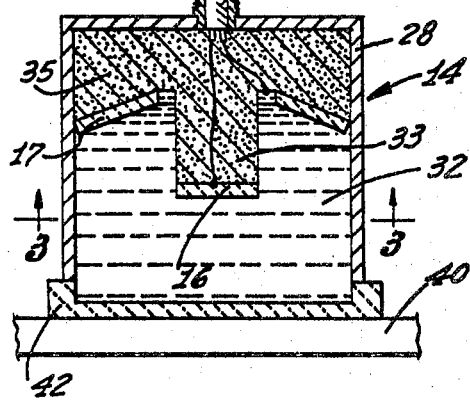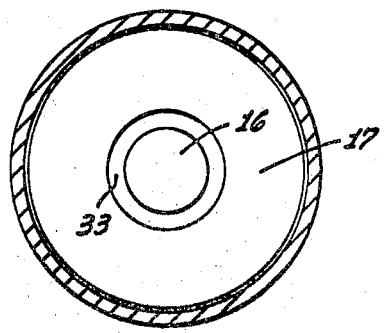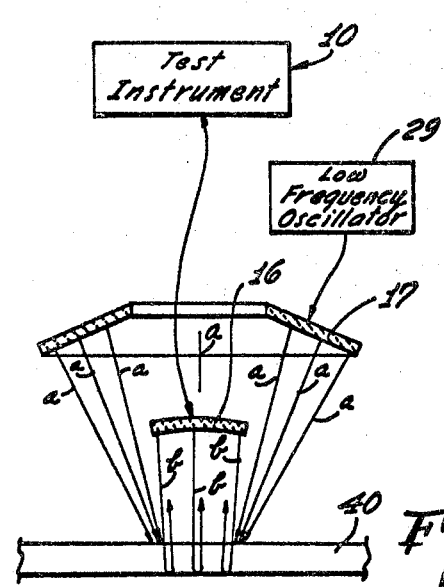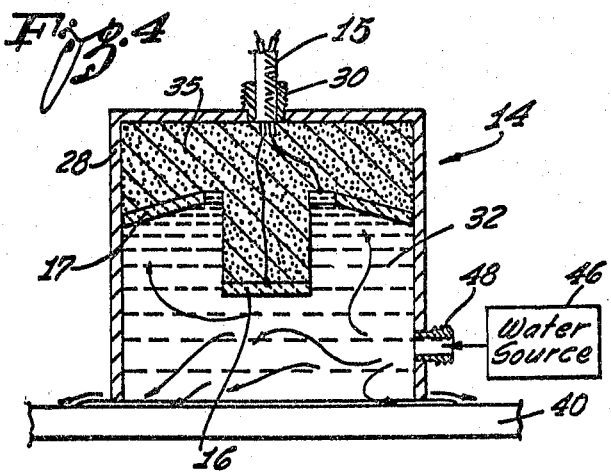

ULTRASONIC NONDESTRUCTIVE MATERIAL TESTER

CROSS REFERENCE TO RELATED APPLICATION

This is a Continuation of co-pending application Ser. No. 790,308, filed Jan. 10, 1969, now abandoned, for Ultrasonic Nondestructive Material Tester on behalf of Albert S. Birks.

BACKGROUND OF THE INVENTION

A. Field of the Invention

This invention relates to nondestructive search systems and more particularly to a novel and improved search unit for testing hot workpieces.

B. Description of the Prior Art

In the prior art there is provided electrical nondestructive test equipment which generates ultrasonic vibrations by use of a crystal transducer. The vibrations from the transducer are then sent in the form of an acoustical pulsed beam into the workpiece being tested. The beam travels unimpeded through large metallic parts and reflects back from the inner surfaces thereof. Any flaw, defect or any other discontinuity in the workpiece also causes reflections of the acoustical beam back to the instrument which indicates the location and size of discontinuity on a display, such as an oscilloscope. The search unit needs only access to one side of the workpiece being tested. The pulse of high frequency vibration is projected from the search unit into the workpiece. A portion of the pulse is reflected back by the flaw or defect and the balance is reflected from the end surfaces. The return energy is amplified and displayed on an oscilloscope as vertical spikes. The screen on the oscilloscope shows spikes of the initial pulse, the defect and the back and front surface reflections. Spacing of the spike on the scope is in proportion to the distance the beam travels in the material tested, thus locating the position of any flaw by irregularly spaced spikes as well as measuring the overall thickness of the part.

In the prior art it is well known to use a liquid couplant between the transducer and the workpiece. This couplant is provided between the workpieces and the transducer by being encased within the search unit and also by being spread on the top surface of the workpiece. In some prior art search units the couplant is provided from a source into the transducer in a continuous supply and couples the transducer to the workpiece.

A problem arises when using search units with the liquid couplant for testing hot workpieces. The water from the search unit used as the couplant will normally boil and vaporize when testing at high temperatures, for example, 300° to 400° F. When the couplant begins to boil, it causes vapor bubbles to build up on the surface of the part. The ultrasonic vibrations from the transducer reflect from these vapor bubbles and cause random noise to appear in the test system. Such noise reflected directly back to the scope and may appear erroneously as defects in the material. Further, vapor scatters the ultrasonic energy making the tests difficult to perform and interpret correctly.

Present techniques for ultrasonic testing of high temperature metals is to use low vapor point liquids as a couplant to eliminate the boiling and evaporation thereof at the workpiece surface but these techniques are not always effective. Further, if cold liquids were used they may crack or cause shelling of the hot workpiece which is being tested.

SUMMARY OF THE INVENTION

Briefly described, the present invention, in combination, for example, with a nondestructive test system, has a search unit including a first transducer which radiates ultrasonic energy into a workpiece. A liquid couplant is positioned into communication with the first transducer and the workpiece. A second transducer is provided for impinging ultrasonic energy into the liquid couplant to agitate the liquid couplant in the area where the first transducer radiates the ultrasonic energy into the workpiece. This provides that the liquid couplant in the area will continue to move about and allow cooler couplant to be in this critical area to attenuate any bubbles or other air vapor in this area so that they shall not show on the readout mechanisms.

A feature of such a combination would allow precision inspection and measurements of high temperature materials by either ultrasonic shear or compressional waves. This allows that high temperature testing can be performed with medium vapor point couplants and thus obtain an improved ultrasonic test permitting the use of warmer couplants, thereby reducing the possibility of stress which may crack the workpiece.

DESCRIPTION OF THE DRAWINGS

These and other features and advantages will become apparent to those skilled in the art when taken into consideration with the following detailed description, wherein like reference numerals indicate like and corresponding parts throughout the several views, and wherein:

FIG. 1 is a block diagram of a nondestructive ultrasonic testing system embodying one form of the invention;

FIG. 2 is a section view of the ultrasonic search unit of the testing system shown in FIG. 1;

FIG. 3 is a cross-section view taken along the lines 3—3 of FIG. 2;

FIG. 4 is a section view of a further embodiment of the ultrasonic search unit of the test system shown in FIG. 1; and FIG. 5 shows energy lines of the ultrasonic beam from the search unit in accordance with the principles of this invention.

DESCRIPTION OF A PREFERRED EMBODIMENT

Turning now to FIG. 1, there is shown a nondestructive testing instrument 10 which includes a pulse generator 11 which produces a series of intermittently occurring high voltage, high frequency pulses. Pulse generator 11 is coupled to a transmitter 12 which transmits these high frequency pulses into a search unit 14. The transmitter 12 may be coupled to the search unit 14 by a coaxial cable 15. The pulses emitted by the transmitter 12 excite a transducer 16 within the search unit 14 (FIG. 2) whereby corresponding pulses of ultrasonic energy are transmitted therefrom.

Echoes from the pulses are received by the search unit 14 whereby a similar electrical signal is produced therefrom. This electrical signal is returned through the cable 15 to receiver 18. The receiver 18 is coupled to a vertical deflection generator 19 which, in turn, is coupled to an oscilloscope 20. The pulse generator 11 is also coupled to a horizontal sweep generator 22 which, in turn, is also coupled to the oscilloscope 20.

The output signal from the vertical deflection amplifier corresponds to the output signal from the receiver 18 and is displayed in a display 24 on the face of the oscilloscope 20. The screen of the oscilloscope reflects the return energy in the form of spikes of the initial pulse. Also shown are spikes indicative of the defects and the back reflections from the material being tested. Spacing of the spikes is in proportion to the distance into the material tested. Any random spikes which appear between the initial spacing is indicative of flaws, defects or other discontinuities in the workpiece being tested. Thus, the location of these flaws are identifiable by the random spikes between the initial return spikes.

In accordance with the principles of this invention, the search unit 14 directs the beams of ultrasonic energy from a transducer 16 in a preferred direction. The search unit 14 comprises a housing 28 having a coaxial fitting 30 protruding from one end thereof. The coaxial cable 15 is connected to the fitting 30 and couples the search unit 14 into the test instrument 10 and into a low frequency oscillator 29. A lead 31 couples the pulse generator 11 to the oscillator 29 to provide for synchronizing the testing pulse with the vapor dispersing pulse of oscillator 29.

The search unit 14, shown in FIG. 2, includes a housing 28 having a cavity 32 in the end opposite the coaxial fitting 30. Disposed within the cavity 32 is the first transducer 16 and a second transducer 17. In this particular emodiment the transducers 16 and 17 may be composed of a piezoelectric crystals. The first transducer 16 is circular in shape and protrudes downwardly into the cavity 32 of the housing 28. The second transducer 17 is preferably frustro conical and has a hole 33 therein. Transducer 16 may have a plano-convex surface for radiating energy to a desired focal point. The transducer 17 may also have a plano-convex surface so that the ultrasonic energy therefrom may impinge upon the same entrant area which the ultrasonic energy from the transducer 16 enters the workpiece 40.

In the particular embodiment shown in FIGS. 2 and 3, it should be noted that the transducer 16 is positioned below and substantially closer to the workpiece 40 than the transducer 17. A potting compound 35 fills the housing 28 on the back surface of the transducers 16 and 17 in order to dampen the ultrasonic energy which is emitted from the back surfaces thereof. Further, the cavity 32 which is within the housing 28 and below the transducers 16 and 17 is filled with a liquid couplant. FIG. 2 shows a contact shoe 42 which is placed in acoustic communication with the surface of the workpiece 40 which is under test. A supply of liquid couplant may be disposed between the shoe 42 and the workpiece 40 in a manner well known to those skilled in the art to provide the acoustic coupling therefor.

The transducer 16 is coupled directly into the transmitter 12 and receiver 18 of the test instrument 10. The transducer 17 is coupled directly to a low frequency oscillator 29. The frequency of the output signal from the oscillator 29 and applied to the transducer 17 is effective to cause the transducer 17 to radiate ultrasonic energy. This ultrasonic energy from the transducer 17 is not intended to form any part of the testing function. Instead it is only intended to be used to agitate the liquid couplant particularly adjacent to the shoe 42. As a consequence it does not form any part of the testing function per se. In fact, the lead 31 from the pulse generator 11 is effective to synchronize the operation of the oscillator 29. The ultrasonic energy radiated from the transducer 16 enters the workpiece 40 for inspection purposes. By virtue of transducer 17 the liquid within the housing 28 and around the shoe 42 is agitated. As a consequence the liquid within the housing 28 will be moved about sufficiently to prevent it from boiling particularly in the entrant area. As a consequence, any bubbles which might otherwise be formed by the boiling of the liquid in this area will be prevented from forming and/or will be dispersed whereby they will not be exhibited by the test instrument 10 as a noise on the scope 20, which would otherwise be the case.

The frequency transmitted by the transducer 17 for agitating the liquid is not believed to be particularly critical. Accordingly, it is believed the frequency may vary over a considerable range. For a suggested range of frequencies, reference may be had to the article entitled "Ultrasonic Quenching" in the August-September 1966 Edition of "Metal Treating." As set forth in this article, a frequency of approximately 20 KCS is said to be quite effective to produce adequate agitation to eliminate the formation of a vapor barrier.

FIG. 4 illustrates a different embodiment whereby water is constantly supplied to the search unit 14 from the source 46. In this particular embodiment a supply of water is continuously supplied through the search unit 14 into the cavity 32 by way of the water source 46 being coupled to a fitting 48. A small amount of water is continuously supplied into the cavity 32, whereby it flows out between the search unit 14 and the workpiece 40 to provide the couplant. In this embodiment, the ultrasonic energy from the transducer 17 still impinges upon the same area as the ultrasonic energy is radiated from the transducer 16. This also insures the couplant in this area being agitated. It also assures a fresh supply of cooler water being directed into the area of shoe 42. As a consequence a warmer coolant may be supplied from the source 46 without bubbles forming as a result of boiling. This is useful to prevent the cracking of the workpiece 40, particularly if the workpiece has an extremely hot temperature itself.

With reference now to FIG. 5, there is shown a schematic-type drawing of the transducers 16 and 17 and their positioning relative to each other and to the workpiece 40. The energy lines from the transducer 17 are given the reference letter $a$. They are shown as they impinge upon the same area as the ultrasonic energy from the transducer 16. This energy from the transducer 16 is coupled into the workpiece 40 for ultra sonic testing purposes. The ultrasonic testing energy is denoted by the reference letter $b$. It can be seen that the transducer 16 is used for conveying test information to the test instrument 10. The transducer 17, being supplied with a low frequency energy from the low frequency oscillator 29, is used to agitate the liquid couplant in the area when the energy from the tranducer 16 enters the surface of the workpiece 40 thereby preventing any gas bubbles which otherwise form in the couplant and/or breaking them up if they do form.

Having thus described but one preferred embodiment of this invention, what is claimed is:

1. A search unit for testing a workpiece including the combination of a housing adapted to be placed in intimate contact with the workpiece, transducer means in said housing for transmitting ultrasonic energy, and a fluid couplant in said housing for acoustically coupling the transducer means to the workpiece, said transducer means being constructed and arranged to transmit and receive ultrasonic energy at a first and relatively high testing frequency in which the workpiece is inspected for discontinuities therein and to transmit ultrasonic energy at a second and relatively lower frequency selected particularly for and being effective to agitate said fluid couplant so as to condition said couplant for effective transmission and reception of ultrasonic energy at said testing frequency.

2. The search unit of claim 1 wherein the transducer means includes a first transducer for transmitting the ultrasonic energy at said first frequency, and a second transducer for transmitting the ultrasonic energy at said second frequency.

3. A search unit for testing a workpiece including the combination of a housing, a liquid couplant in said housing, a first transducer means disposed in said housing and communicating with the couplant for radiating ultrasonic energy through said couplant and into the workpiece and for receiving reflected ultrasonic energy from such workpiece, said energy having a first relatively high frequency effective to penetrate into the workpiece and reflect from discontinuities therein, and a second transducer means disposed in said housing and communicating with the couplant for radiating ultrasonic energy through said couplant, the energy radiated by said second transducer means having a second frequency lower than said first relatively high frequency, said second frequency selected particularly for and only for agitating said liquid couplant.

4. The search unit of claim 3 wherein the first transducer means is disposed in the center of said housing, and the second transducer means is disposed concentric about the first transducer.

5. A nondestructive testing system for inspecting workpieces, said system including the combination of an ultrasonic search unit adapted to be acoustically coupled to the workpiece, a first transducer in said search unit for transmitting ultrasonic energy, a second transducer in said search unit for transmitting ultrasonic energy, a liquid couplant in said search unit acoustically coupling said first and second transducers to the workpiece, first transmitting means for providing a first electrical signal, said first transmitting means being coupled to said first transducer for energizing said transducer whereby said first transducer transmits ultrasonic energy through the couplant and into the workpiece such that echoes of the ultrasonic energy are reflected from within the workpiece back to the first transducer, said first electrical signal effective to energize said first transducer at a relatively high testing frequency, a receiver coupled to the first transducer for receiving the signal produced by said first transducer as a result of said echoes, and second transmitting means for providing a second electrical signal, said second transmitting means being coupled to the second transducer to energize such transducer to transmit ultrasonic energy through the couplant to the workpiece, said second electrical signal being selected to cause said second transducer to transmit ultrasonic energy of a frequency and magnitude sufficient to agitate the couplant adjacent the face.

6. A nondestructive testing system for inspecting hot workpieces, said system including the combination of an ultrasonic search unit adapted to be coupled to the workpiece, a liquid couplant in said search unit in intimate contact with the workpiece, a first transducer in said search unit immersed in said couplant for transmitting ultrasonic energy through said couplant and into the workpiece in response to an electrical signal and for generating an electrical signal in response to ultrasonic energy which returns from the workpiece and passes through said couplant so as to be incident upon said first transducer, first means coupled to said first transducer for providing an electrical signal effective to cause said first transducer to transmit said ultrasonic energy at a relatively high inspection frequency, and second means coupled to the second transducer for providing a second electrical signal effective to cause the second transducer to transmit ultrasonic energy at a liquid agitating frequency which is lower than said inspection frequency whereby the liquid couplant in said search unit is agitated to minimize the presence of bubbles in said couplant adjacent the workpiece wherein such bubbles otherwise interfere with the transmission of ultrasonic energy at said inspection frequency.

7. The nondestructive testing system of claim 6 wherein the second means includes an oscillator.

8. A method of ultrasonically testing a hot workpiece with an ultrasonic search unit having first and second transducers acoustically coupled to the workpiece through a liquid couplant, comprising:

transmitting by said first transducer ultrasonic energy of a relatively high testing frequency through the couplant and into the workpiece and receiving relatively high frequency energy reflected from discontinuities within the workpiece and returned to the first transducer through the liquid couplant, and transmitting by the second transducer ultrasonic energy of a relatively low liquid agitating frequency to agitate the liquid couplant for dispersing vapor deposits formed within the liquid couplant adjacent the hot workpiece, whereby the liquid couplant is maintained relatively free of vapor bubbles which otherwise interfere with the transmission of ultrasonic energy at the higher inspection frequency.

9. The method as defined in claim 8 further comprising:

applying an electrical signal to the second transducer from an oscillator having a frequency selected to energize the second transducer at said relatively low liquid agitating frequency.

10. The method of claim 8 further comprising:
focusing the relatively low frequency ultrasonic energy from the second transducer to agitate the liquid couplant adjacent an area of the workpiece at which ultrasonic energy at the relatively high testing frequency from said first transducer enters the workpiece.

* * * * *